United States Patent [19]

Thissen

[11] 4,115,268

[45] Sep. 19, 1978

[54] WASTE WATER TREATMENT ROTOR

[76] Inventor: Christopher P. Thissen, 305 - 2nd Ave. SW., Austin, Minn. 55912

[21] Appl. No.: 796,874

[22] Filed: May 16, 1977

[51] Int. Cl.² .............................................. C02C 1/02
[52] U.S. Cl. ...................................... 210/150; 261/92
[58] Field of Search .................. 210/150, 151; 261/92

[56] References Cited

U.S. PATENT DOCUMENTS

| 2,879,979 | 3/1959 | Wheeler | 261/92 |
|---|---|---|---|
| 3,777,891 | 12/1973 | Stengelin | 210/150 |
| 3,827,559 | 8/1974 | Gass et al. | 210/150 |
| 3,847,811 | 11/1974 | Stengelin | 210/150 |
| 3,894,953 | 7/1975 | Torpey | 210/151 |
| 3,904,525 | 9/1975 | Rosenberg | 210/150 |
| 3,997,443 | 12/1976 | Thissen | 210/150 |

FOREIGN PATENT DOCUMENTS

| 935,162 | 8/1963 | United Kingdom | 210/151 |
|---|---|---|---|
| 1,333,061 | 10/1973 | United Kingdom | 210/151 |
| 1,397,664 | 6/1975 | United Kingdom | 210/151 |

Primary Examiner—John Adee
Attorney, Agent, or Firm—H. Dale Palmatier

[57] ABSTRACT

A rotor for biological treatment apparatus, a plurality of cylindrical shaped waste water treatment modules on the shaft in closely spaced end-to-end relation with each other, each module including a convolute of sheet plastic spirally wound in a plurality of turns separated by cup-shaped recesses or irregularities welded to the next adjacent turn in the convolute and defining flow channels extending endwise through the cylindrical module and circumferentially thereof between adjacent turns of the convolute.

8 Claims, 10 Drawing Figures

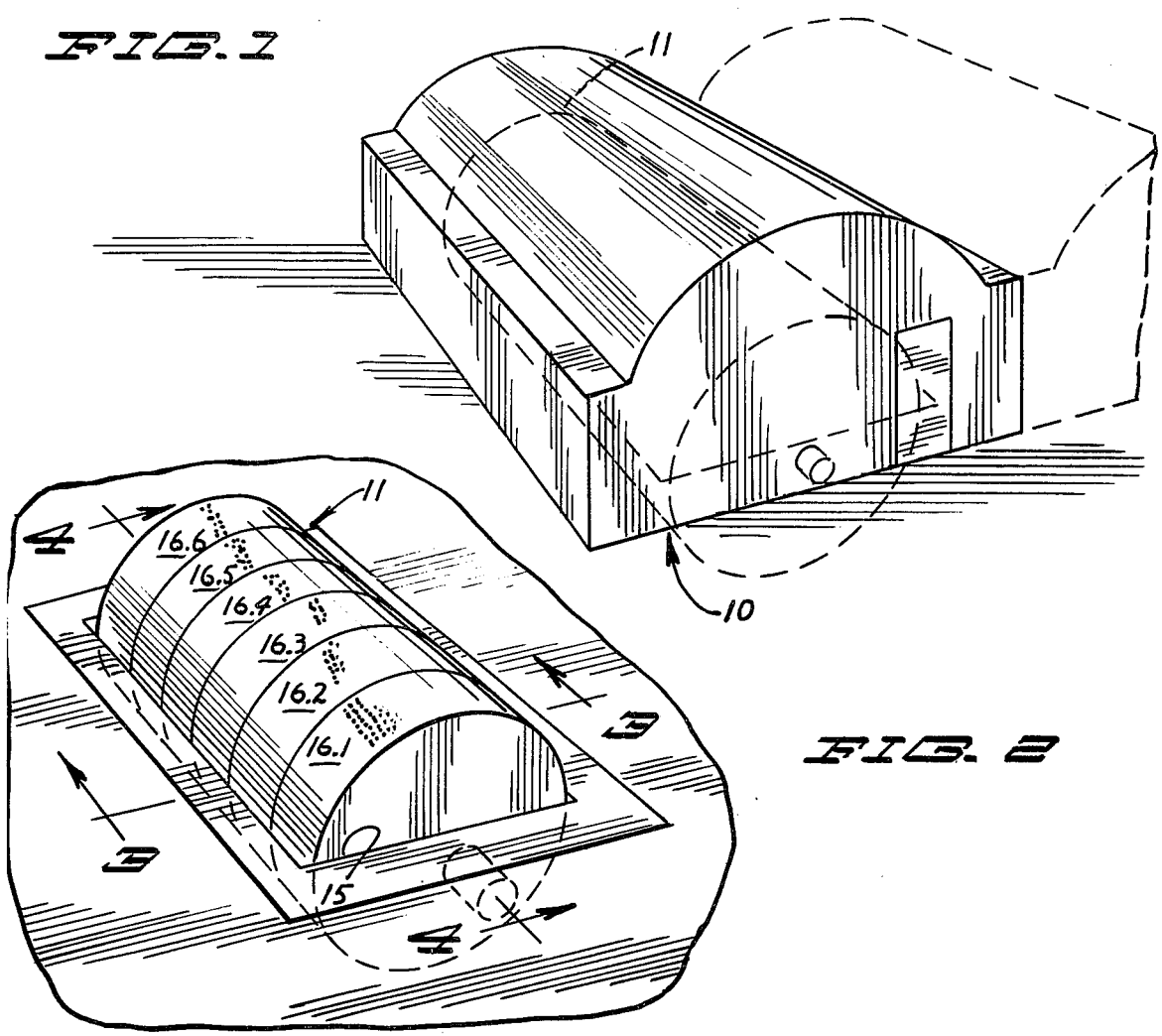
FIG. 1
FIG. 2
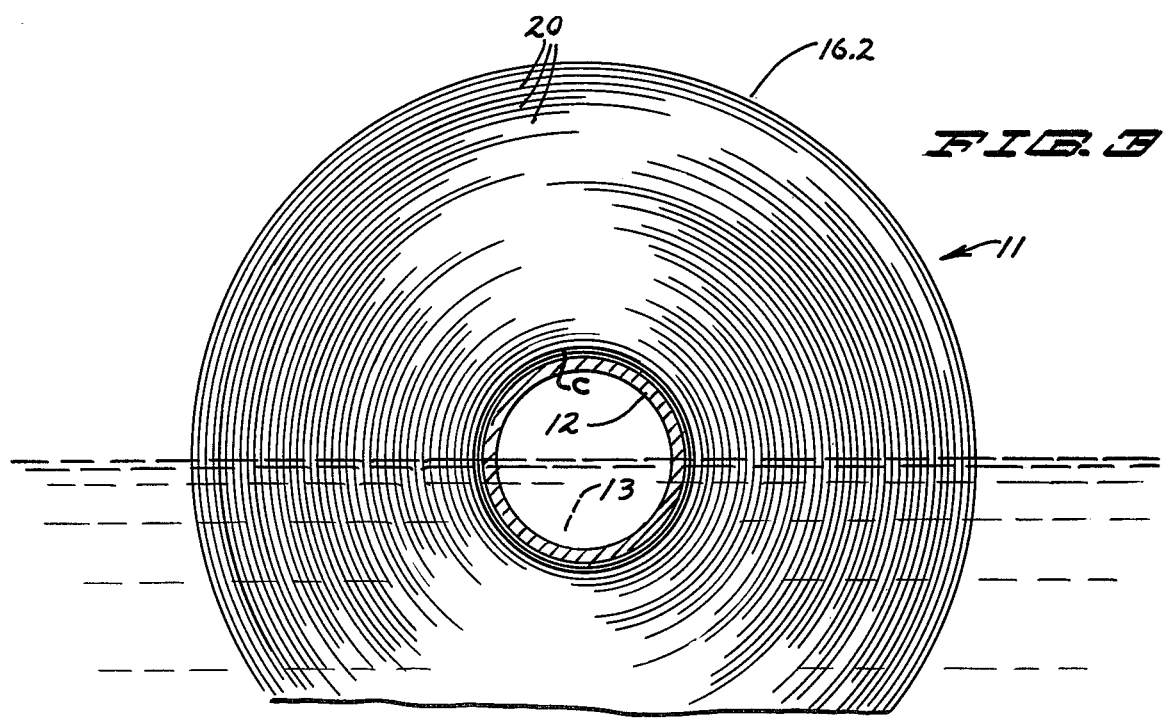
FIG. 3

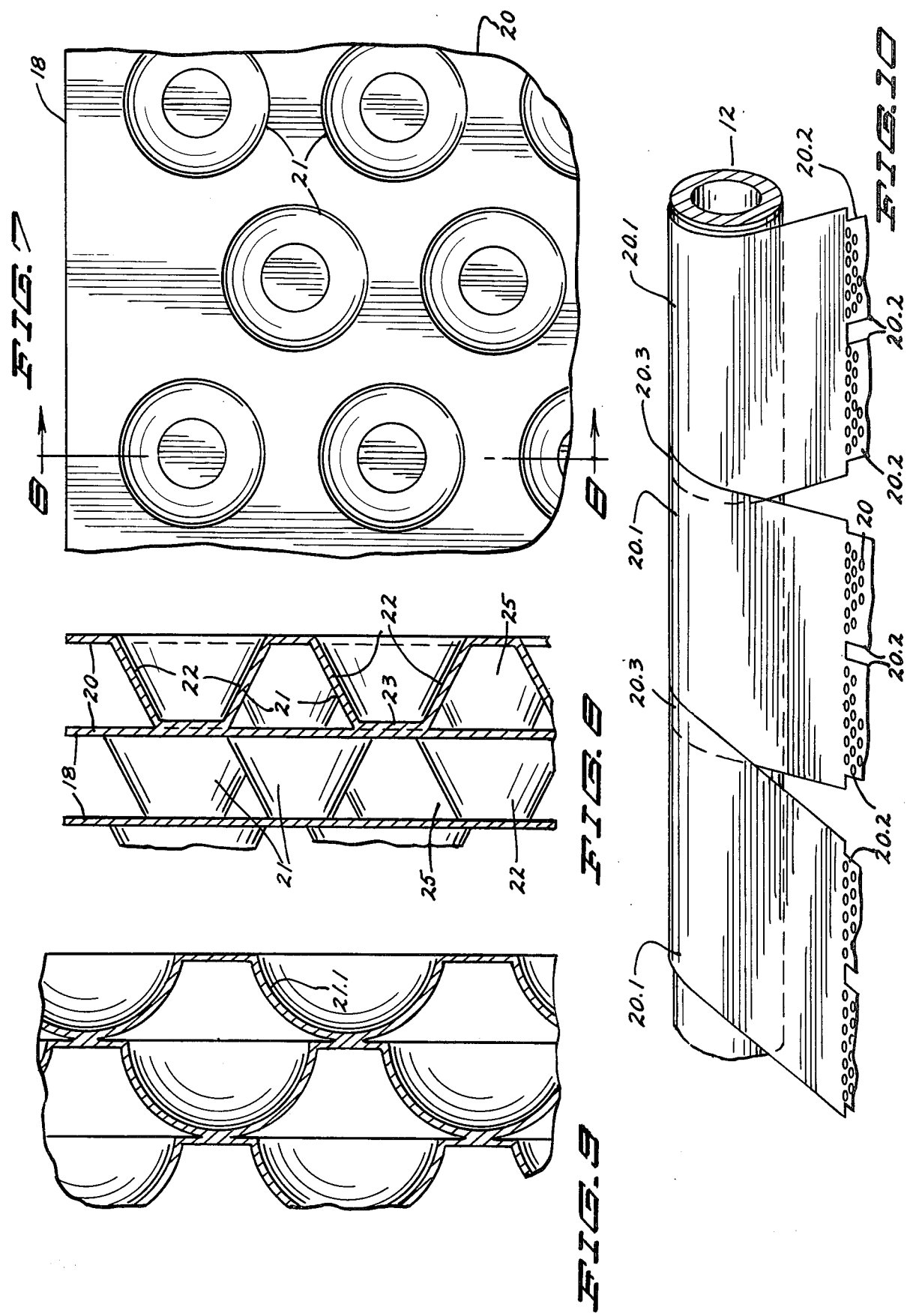

WASTE WATER TREATMENT ROTOR

This invention relates to an apparatus for the biological treatment of waste water and more particularly to revolving contactors.

BACKGROUND OF THE INVENTION

The biological treatment of waste water for the removal of BOD involves the use of one or more partially submerged bodies forcibly rotated to expose the organisms on the contact surfaces to the atmosphere for the absorption of oxygen. The growth of the biological slimes on the surfaces of the rotating contactor is thereby encouraged. Such rotors are of substantial size and oftentimes are ten to twelve feet in diameter and lie horizontally so that the axis of rotation is adjacent the level of the waste water in the tank. Approximately the lower half of the rotor is immersed in the waste water and the upper half is out of the waste water and exposed to the atmosphere or air.

Such rotary biological treatment rotors have been known in several forms in the past as illustrated in U.S. Pat. No. 3,894,953 which generally describes the biological treatment process, but does not describe in detail the nature of the contactors or rotors. British Pat. No. 935,162 discloses the use of banks of plates or discs of plastic, approximately a half inch thick and mounted on an axle to be turned through the waste water in a tank. U.S. Pat. No. 3,777,891 describes the revolving discs in a biological treatment apparatus as being constructed as foamed synthetic resin such as foamed polystyrene. Such discs have also been indicated to be of styrofoam, and held together by tie bolts and spacers to allow waste water to pass between the discs.

British Pat. No. 1,333,061 also suggests the use of non-porous or woven mesh or with perforations formed by punching, expanding, or molding.

Other disc configurations in such biological treatment systems have been variously shaped, as in U.S. Pat. No. 3,997,443 wherein the discs have peripheral ribs on their opposite faces; in U.S. Pat. No. 3,827,559 formed plastic sheets of polystyrene or polyethylene lie transversely of and on the central axle and cooperate with each other to define radially extending and concentric passages to induce trickling and movement of the waste water through the discs as they revolve. My copending application executed Oct. 21, 1976, discloses polyethylene or polystyrene plastic sheets up to 12 feet in diameter and tied together with tie rods on a central shaft wherein the discs have cup-like recesses over their entire faces.

In U.S. Pat. No. 3,904,525, plastic discs are formed with various configurations for being spaced apart, and the discs are mounted in banks spaced from the rotation axis around which the discs orbit and are carried entirely downwardly into the waste water tank and then entirely removed. This patent also illustrates such discs in segment shapes rather than in entirely circular shapes.

British Pat. No. 1,397,664 discloses another rotor arrangement wherein plastic filter packs, which are rectangular and box-like in shape with openings and/or channels extending therethrough, are mounted in spaced relation to a rotation axis so that the filter packs swing down through a body of waste water to be entirely immersed and entirely removed from the waste water. U.S. Pat. No. 3,847,811 discloses a rotor with plates spaced from each other and lying substantially normal to radii of the axis. The plates are mounted on a rotor frame to be immersed entirely into the waste water and then entirely removed.

All of the prior art and other previously known arrangements have distinct problems because auxiliary structural support means are necessary in order to hold them in desired positions. Such auxiliary support structure, whether it be tie rods, or brackets or frames, will deteriorate over a period of time and will necessitate a considerable amount of maintenance which, in a large piece of equipment such as these rotors, can involve a considerable amount of effort, time and expense, and of course, the system must be shut down while such maintenance is being carried out. Furthermore, the previous rotors have not made efficient use of the available space so as to obtain a maximum exposure of the waste water to air when the wetted media emerges from the waste water.

SUMMARY OF THE INVENTION

The present invention incorporates, in the biological treatment rotor, a stiff laminar or sheet material of a biologically inert plastic material such as high density polyethylene, with a thickness estimated at one-sixteenth of an inch (0.0625 inches) and wherein the laminar material is provided with a multiplicity of irregularities or cup-like recesses spread substantially entirely over its face, and wherein the sheet material is wrapped spirally around a central shaft and in a multiplicity of convolutions so that there is a substantial number of flow passages for waste water and air in directions parallel to the axis and also around the periphery. Overall, the rotor is generally cylindrically shaped and the multiplicity of convolutions of the sheet material are maintained in spaced relation by the cup-shaped recesses formed therein. The bottoms of the cup-shaped recesses are welded to the underlying convolution of the sheet material so that the entire rotor is a structurally strong and of a substantially homogeneous, one piece construction which offers substantially no possibility that any portion of the rotor will have relative movement with respect to any other portion of the rotor. There will be essentially no tendency for any wobbling or deformation of the rotor as it revolves.

The rotor from end to end, is formed in a plurality of individual modules, each spaced from the adjacent module and each being spirally wound of the plurality of convolutions of the sheet material.

The inner end of the spirally would plastic sheet material is plain and not recessed so that the sheet material lies flush against the shaft and entirely seals the shaft away from the waste water in the tank. As a result, the likelihood of deterioration of the central shaft is materially reduced.

The sheet material is slit as it is spirally wound onto the shaft as the convolutions are sequentially welded together, thereby forming separate treating modules spaced from each other along the shaft.

DESCRIPTION OF THE DRAWINGS

FIG. 1 is a perspective view of a building in which the biological treatment system is housed.

FIG. 2 is a perspective view of the biological treatment rotor partially immersed in a tank of waste water.

FIG. 3 is a detailed section view taken at 3—3 of FIG. 2, but eliminating the tank structure.

FIG. 7 is an enlarged plan view of a small section of the embossed sheet plastic.

FIG. 8 is an enlarged detailed section view taken approximately at 8—8 in FIG. 7 and showing a pair of superposed turns of the sheet material in the convolute.

FIG. 9 is a view similar to FIG. 8, but showing an alternate form of the invention.

FIG. 10 is a diagrammatic perspective illustrating the manner of forming the modules on the shaft.

DETAILED SPECIFICATION

Figure 4:
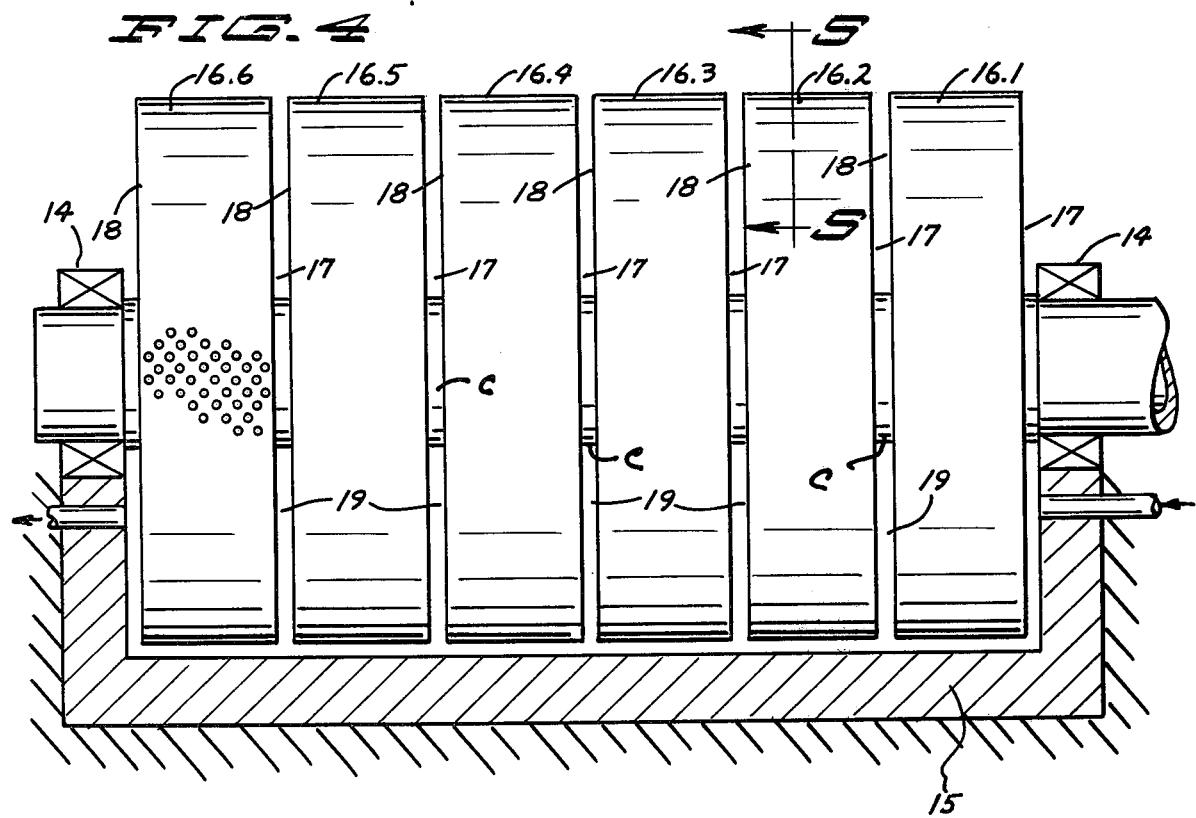
FIG. 4 is a detailed longitudinal section taken at approximately 4—4 in FIG. 2.

One form of the invention is shown in the drawings and is described herein. The biological treatment apparatus with which the present invention deals is preferably confined within a building 10 as illustrated in FIG. 1 so as to keep the sunlight off the rotor 11 of the biological treatment system. The rotor is of substantial size and typically, the rotor may be 10 to 12 feet in diameter and 24 feet in length. The shaft 12 of the rotor 11 is preferably of steel and is cylindrical and contains a small pool 13 of oil which continually sloshes around in the shaft to minimize any likelihood of substantial corroding within the shaft. The shaft 12 is mounted in suitable bearings 14 at the opposite ends of a waste water tank 15 which conforms rather closely to the shape of the rotor 11 as to allow only minimum clearance between the surface of the tank and the rotor periphery.

The rotor includes a plurality of substantially identical modules 16.1, 16.2 ... 16.6, each of which is substantially cylindrical in shape and has opposite ends 17 and 18 in planes lying perpendicular to the rotation axis of the shaft. The several modules 16.1–16.6 are spaced slightly from each other, but by a significant distance as to define a peripheral flow passage 19 extending from the outer periphery of the rotor entirely to the inner periphery of each of the modules.

Each of the modules 16.1–16.6 is substantially identical to each of the other modules, and an understanding of one such module will suffice for an understanding of all of the modules.

Figure 5:
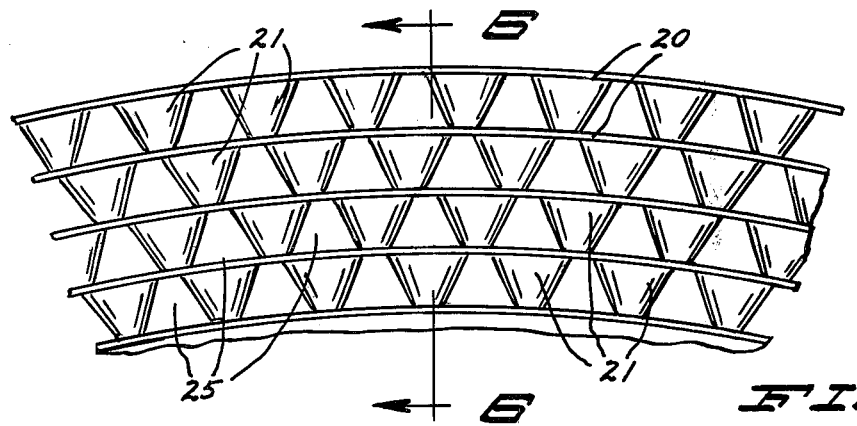
FIG. 5 is a detailed section view taken approximately at 5—5 in FIG. 4.
Figure 6:
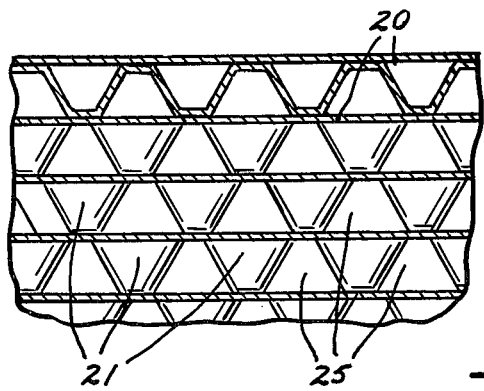
FIG. 6 is a detailed section view taken approximately at 6—6 in FIG. 5.

Each of the modules comprises a convolute of stiff sheet plastic 20 in an elongate strip which is spirally wound in many turns around the central shaft 12. The sheet plastic 20 is of relatively stiff construction and may be formed of high density polyethylene or other biologically inert materials. Typically, the sheet plastic 20 may be approximately one sixteenth of an inch thickness (0.0625 inches). The strip of sheet plastic 20 has a multiplicity of discrete irregularities 21, in the form of individual cup-shaped recesses embossed therein and all protruding transversely of the sheet plastic. The individual cup-shaped recesses or irregularities 21, have peripheral sidewalls 22 which are oriented at sharp wide angles with respect to the main body of the plastic sheet strip 20 and with respect to the bottom 23 of the recess. It will be recognized, especially in FIGS. 5 and 6, that the bottoms of the cup-shaped recesses 21 in the sheet plastic lie upon and are welded to the sheet plastic in the next adjacent turn of the convolute. The weld between the bottom of the cup-shaped recess and the next adjacent convolute is indicated by the numeral 24. Accordingly, it will be noted that the peripheral sidewall 22 of each of the cup-shaped recesses is also oriented at a sharp wide angle with respect to the next adjacent turn of the sheet plastic in the convolute.

In one successful version the recesses 21 are approximately 1¼ inches in diameter by three-fourths inch deep and spaced on approximately 1¾ inches centers. The recess bottoms may be approximately one-half inch in diameter.

In FIG. 7, it will be noted that the multiplicity of cup-shaped recesses or irregularities 21 are arranged in ranks and files oriented longitudinally of the strip 20 of sheet plastic, but alternate rows are offset so as to reduce the likelihood of superposed irregularities from nesting together in adjacent turns of the convolute. As is evident in FIG. 5 and FIG. 6, the irregularities 21 in the adjacent turns of the convolute are offset with respect to each other so that the spacing between the turns of the convolute is maintained.

The module is thereby provided with a multiplicity of waste water flow passages 25 between the cup-shaped irregularities and extending between the opposite ends 17 and 18 of each of the modules, and also extending in a circumferential direction of the module and along the turns of the sheet plastic. Accordingly, as the rotor revolves in the tank of waste water, waste water is permitted and induced to flow in directions generally parallel to the rotation axis through each of the modules, and also in directions circumferentially around the module and rotation axis.

As an alternative to the sharply angular shape of the cup-shaped recesses or irregularities 21 in the sheet plastic, the irregularities 21.1 as illustrated in FIG. 9 may be substantially hemispherically shaped with the bottoms of the recesses being welded to the sheet plastic in the next adjacent turn of the convolute.

The method of forming the modules 16.1–16.6 and enclosing the shaft 12 with the strips of sheet plastic 20 is illustrated in FIG. 10. The inner ends 20.1 of the sheet plastic are smooth and flat and without the embossed irregularities previously described. These inner ends of the strips 20 are wrapped several times around the shaft 12 and are significantly overlapped as illustrated in FIG. 10. The extreme inner ends of the strips are affixed to the peripheral face of shaft 12 by any suitable means such as adhesives. The overlapping edges of the adjacent strips of plastic thoroughly seal the shaft and confine the shaft so that it will not be engaged by the waste water flowing in the transverse passages 19 between adjacent modules. As the strip of sheet plastic 20 is being wound upon shaft 12, the strip of sheet plastic is longitudinally slit at several locations as indicated at 20.2 so that from one piece of plastic material, two adjacent modules, such as 16.1 and 16.2 will be formed.

The area 20.3 of overlap between adjacent pieces of plastic sheet material, is thereafter confined within a clamping collar C which may be made of stainless steel or rigid plastic so as to prevent any migration of the waste water into the wrappings of the sheet material, and the shaft 12 is thereby completely protected.

The strips of sheet plastic are wound spirally onto the shaft by revolving the shaft, and as the shaft is revolved and the sheet plastic is spirally wound thereon, the adjoining turns of the sheet plastic are welded together in any suitable way, such as through the use of a heating bar simultaneously engaging the underlying turn of sheet plastic and also the bottoms of the cup-shaped recesses of the new turn of plastic being applied. Alternatively, electronic welding of the plastic upon itself as the turns of the convolute are produced may be utilized.

In any event, as the strips of sheet plastic are wound spirally onto the shaft, each turn of the convolute is welded to the next adjacent turns until a suitable diameter has been attained. When the module is thereby completed, with each turn of the convolute welded to the next adjacent turns, the module is exceedingly stable and structurally rigid. The turns in the convolute are spaced from each other by the depth of the cup-shaped recesses or irregularities, and these irregularities also define the necessary flow channels extending endwise and circumferentially of the module.

The modules may be 10 to 12 feet in diameter and in some instances approximately three feet in length, and because of the integral construction produced by the welding of adjacent turns, there is essentially no tendency of the outer peripheral portions of the module to have any movement relative to the shaft, in either a peripheral direction or a longitudinal direction. As a result, the transverse flow passages 19 between the modules retain their shape to accommodate the necessary flow of waste water therethrough. It should be recognized that this extreme stability in the modules of the rotor is accomplished without use of any metal or other structural pieces or any brackets or framework, and furthermore, the central shaft is entirely enclosed and protected from the deteriorating effect of the waste water.

When the rotor is partially immersed in the tank 15 and the waste water is circulated into and out of the tank at its opposite ends, the waste water will fill the flow channels which really constitute all of the vacant spaces between the adjacent turns of the convolute. As the periphery of the modules revolves to and then above the natural surface of the waste water in the tank 15, substantial quantities of the waste water flow out of the channels and into the passages 19 between the adjacent modules, so that this waste water returns into the tank 15.

As the waste water empties from the flow channels 25 between adjacent turns of the convolute, air will be drawn into the flow channels 25 to replace the water and the air will promote the growth of aerobic bacteria in the waste water on the surfaces of the sheet plastic which thereby promotes the deterioration of the BOD.

As the module, at its opposite side, revolves downwardly into the pool of waste water in the tank 15, the air in the flow channels 25 between the adjacent turns of the convolute is replaced by waste water again which flows endwise of the module inwardly from both ends of the module. Of course, there is a substantial amount of flow of waste water in the flow passages 19 between adjacent modules, and, as the rotor slowly turns and the waste water is gradually treated by exposing the waste water to air to promote the growth of the aerobic bacteria, the BOD in the waste water is significantly reduced prior to discharge of the water from the tank. It will be understood that several such waste water treatment devices may be arranged in series with each other so as to produce successive treatments of the waste water.

It is significant to note, that the sharp wide angles between the several surfaces of each of the cup-shaped recesses or irregularities 21 prevent any significant collection of BOD in the module. There are no small crevices to confine material against exposure to the air.

It will be also recognized that these modules, being spirally wound into a convolute, may be manufactured at considerably reduced cost as compared to prior known biological treatment rotors. No auxiliary supports, braces or framework are required, and the central shaft is entirely protected against deterioration.

The flow of waste water into and out of the flow channels 25, and the similar discharge of air and flow of air into the flow channels improves the processing of the waste water significantly. The rotor may be turned by any suitable source of power, such as by an electric motor through a step down gear drive, and the power required to drive the rotor is materially reduced as compared to other prior rotors because there is significantly less pumping action, and less head of water to work against.

The modules have very significant mechanical reliability and durability, and will resist deterioration over many, many years of usage.

The water can flow directly through the treating modules, and, as a result, there is substantially reduced piping or tankage costs in this type of installation using the present rotor.

The shaft, being hollow, is not subject to interior deterioration by rusting because it may contain a small pool of oil which continually sloshes around and minimizes any likelihood of corrosion.

Air is actually forced through the flow channels 25, primarily by the drainage of the waste water from the flow channels as the modules revolve and move upwardly out of the pool of waste water in the tank. The gravity draining of the waste water from the flow channels causes a partial vacuum which actually draws fresh air into these flow channels for encouraging the growth of aerobic bacteria.

In the manufacture of the rotor and particularly the modules, there is no significant change in the equipment needed for manufacturing rotors of small diameter and rotors of large diameter. When a small diameter rotor is to be constructed, a smaller shaft may be used and the modules simply have less turns of the sheet plastic in the convolute.

It will be seen that I have provided a new and improved waste water treatment rotor utilizing modules of sheet plastic spirally wound in multiple turns as a convolute wherein the multiple turns of the sheet plastic are all welded together for structural rigidity, and wherein the sheet plastic has discrete cup-shaped recesses or irregularities embossed therein to define spaces and flow channels between adjacent turns in the convolute, and wherein the flow channels extend both endwise of the cylindrical modules and circumferentially thereof; the modules being arranged in end-to-end and closely spaced relation on a common shaft for producing multiple treatment of waste water as it flows through the tank in which the rotor is partially immersed.

What is claimed is:

1. A rotor for a waste water biological treatment system, comprising
   a rotatable shaft, and
   a waste water treating module affixed on the shaft and including a convolute of stiff sheet plastic with a multiplicity of turns in the convolute, each turn of the sheet plastic having a pattern of cup shaped irregularities embossed on one face thereof, each of the cup shaped irregularities having an annular wall and a bottom portion welded to the next adjacent turn in the convolute.

2. The rotor according to claim 1 and each of the cup-shaped irregularities having a sidewall oriented at a sharp and wide angle with respect to the bottom of the recess and with respect to the adjoining portions of the sheet plastic and also with respect to the adjacent turns of the convolute.

3. The rotor according to claim 1 and each of the cup-shaped irregularities having a substantially hemispherical shape.

4. The rotor according to claim 1 wherein the sheet plastic, at the inner periphery of the convolute is smooth and free of embossed irregularities and is sealingly wrapped on the shaft to exclude waste water from engaging the shaft.

5. A rotor for a waste water biological treatment system, comprising
a rotatable shaft, and
a plurality of waste water treating modules adjacent each other and affixed on the shaft, said modules being substantially cylindrical in shape and having ends oriented substantially normal to the shaft axis and disposed in closely spaced relation to each other to define a plurality of peripheral waste water flow passages extending inwardly throughout the full radial depth of the module, each of the modules comprising a convolute of stiff sheet plastic with the turns of the convolute being arranged in superposed relation to each other, the sheet plastic in the convolute having a pattern of regularly spaced and cup-shaped irregularities embossed on one face thereof, the bottoms of the cup-shaped irregularities engaging and being welded to the sheet plastic in the next adjacent turn of the convolute and cooperating therewith in defining a plurality of flow channels extending toward the ends of the module and also extending circumferentially of the turns in the convolute, said flow channels being in flow communication with the transverse flow passages between adjacent modules for the reception of and delivery of waste water, and the sidewall of each of the cup-shaped irregularities being oriented at a sharp and wide angle with respect to the bottom of the cup-shaped irregularity and with respect to the adjoining portion of the sheet plastic and also with respect to the adjacent turns in the convolute.

6. The rotor according to claim 5 and the modules being formed of adjoining spirally wound strips of sheet plastic, the sheet plastic at the inner periphery of each of the convolutes being smooth and free of embossed irregularities and being wrapped entirely around the shaft in sealing relation to prevent the shaft from being engaged by the waste water, adjoining strips of the sheet plastic being lapped and enclosed within a clamping collar.

7. A rotor for a waste water biological treatment system, comprising
a rotatable shaft, and
a plurality of substantially cylindrical waste water treating modules affixed on the shaft and having ends adjacent to and closely spaced from each other by significant distances to define peripheral flow passages extending the radial depth of the modules entirely from the outer peripheries thereof and substantially to the shaft, each of said modules including a convolute of stiff sheet plastic with a multiplicity of turns in the convolute, each turn of the sheet plastic having a pattern of cup shaped irregularities embossed on one face thereof, each of the cup shaped irregularities having an annular wall and a bottom portion welded to the next adjacent turn in the convolute, the cup shaped irregularities defining peripheral flow channels between the turns in the convolute and endwise extending flow channels communicating with the peripheral flow passages at the ends of the modules,
the peripheral flow passages accommodating significant flow of waste water in a direction generally transversely of the shaft to recirculate waste water flowing substantially endwise of the shaft and into and out of the flow channels of the individual modules.

8. The rotor according to claim 7 and also including an elongate waste water tank with the shaft oriented substantially horizontally therein and wherein the modules have lower portions below the shaft disposed within the tank and upper portions above the shaft disposed above the tank, the tank having waste water inlet and outlet ports respectively disposed adjacent the opposite ends of the tank to induce waste water flow substantially endwise through the tank and generally longitudinally of the shaft.

* * * * *